(12) United States Patent
Bigeh

(10) Patent No.: US 9,838,773 B2
(45) Date of Patent: Dec. 5, 2017

(54) MICROPHONE CABLE ADAPTOR AND PLENUM SEAL

(71) Applicant: Audix Corporation, Wilsonville, OR (US)

(72) Inventor: Fred Bigeh, Wilsonville, OR (US)

(73) Assignee: Audix Corporation, Wilsonville, OR (US)

( * ) Notice: Subject to any disclaimer, the term of this patent is extended or adjusted under 35 U.S.C. 154(b) by 286 days.

(21) Appl. No.: 14/226,902

(22) Filed: Mar. 27, 2014

(65) Prior Publication Data

US 2014/0301566 A1   Oct. 9, 2014

Related U.S. Application Data

(60) Provisional application No. 61/809,915, filed on Apr. 9, 2013.

(51) Int. Cl.
  *H04R 1/02* (2006.01)
  *H04R 1/10* (2006.01)
  *H02G 3/08* (2006.01)
  *H02G 15/013* (2006.01)

(52) U.S. Cl.
  CPC ........... *H04R 1/1033* (2013.01); *H02G 3/083* (2013.01); *H02G 15/013* (2013.01)

(58) Field of Classification Search
  CPC ............... H04R 1/08; H04R 1/02; H04R 1/06

USPC ........................................................... 381/91
See application file for complete search history.

(56) References Cited

U.S. PATENT DOCUMENTS

| | | | | |
|---|---|---|---|---|
| 4,717,792 A | * | 1/1988 | Sterritt | H02G 15/013 174/88 C |
| 2011/0122608 A1 | * | 5/2011 | Napier | F21V 21/104 362/184 |
| 2012/0329311 A1 | * | 12/2012 | Duval | H01R 13/59 439/449 |

* cited by examiner

*Primary Examiner* — Alexander Jamal
(74) *Attorney, Agent, or Firm* — Klarquist Sparkman, LLP

(57) ABSTRACT

An adaptor for retaining and suspending cabled microphones comprises a main body having a first threaded end and an opposite second threaded end with a circumferential flange separating the first and second threaded ends and extending from the main body. A bore extends longitudinally through main body. A cap threads onto the first threaded end and a nut threads onto the second threaded end. The microphone cable extends through a bore in each of the nut and the cap and through the bore 20 through main body. An O-ring is captured between the cap and main and prevents relative movement between the cable and the main body when the cap is tightened, and creates a plenum seal through the adaptor.

15 Claims, 6 Drawing Sheets

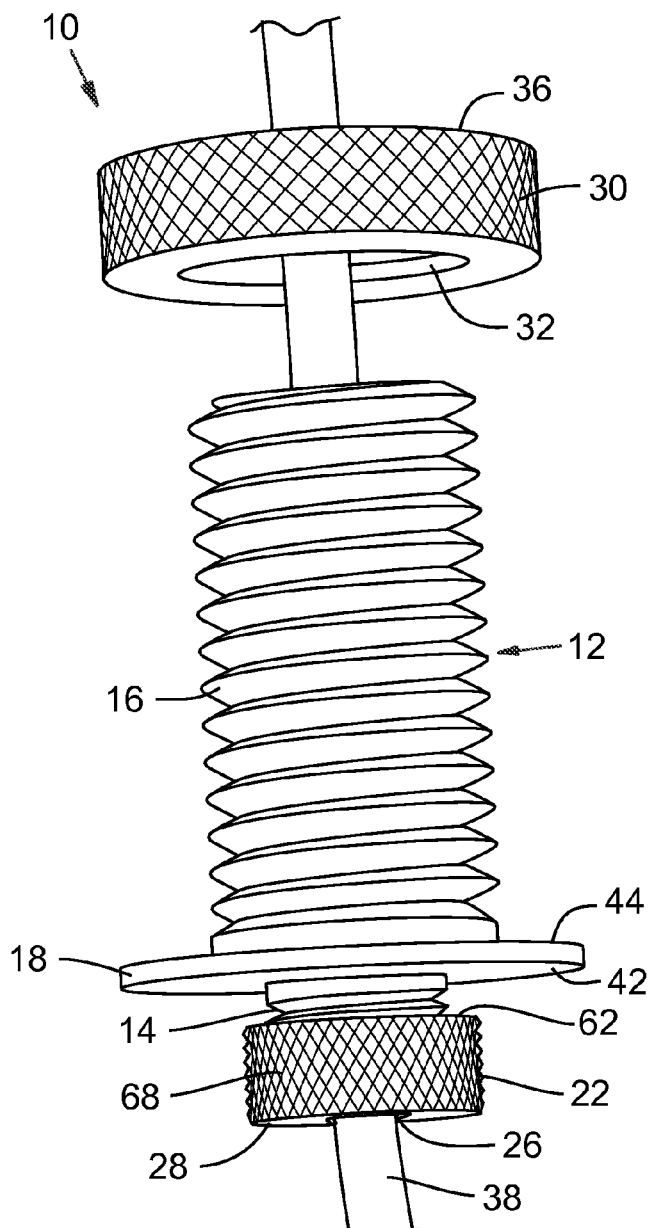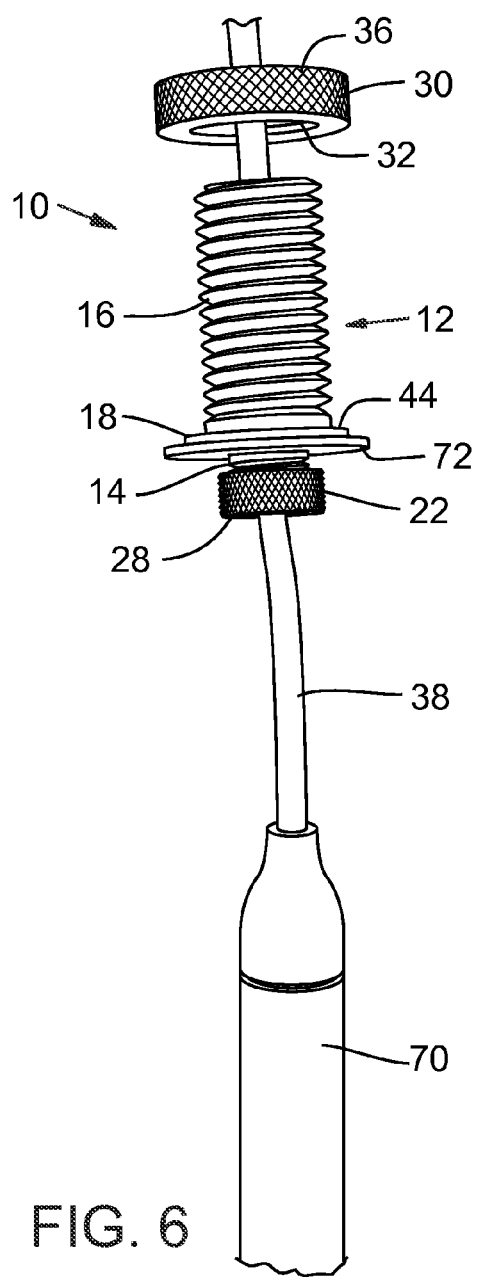

MICROPHONE CABLE ADAPTOR AND PLENUM SEAL

TECHNICAL FIELD

The present invention relates to apparatus used to position microphones and the like, and more particularly to an adaptor for suspended microphones wherein the microphone cable is threaded through the adaptor and may be adjusted to reposition the microphone and tightened to create a seal between the adaptor and the cable to create a plenum seal.

BACKGROUND

Wired microphones require a cable that electrically connects the microphone to the electronics that power and control the microphone. Often, the cabling that connects the mic to the electronics creates difficulties in both positioning the mic in desired locations, and in routing the cable. For instance, if the mic is suspended by the cable and the user wants it in any orientation other than vertical, the cable tends to spin, making precise directional control difficult. The cable routing is also a problem in many installations. Thus, in many localities building codes, fire codes and similar ordinances place specific requirements for creating a plenum between the living or working space and the space above a drop ceiling. When the microphone cable is extended through the drop ceiling, the cable may destroy the plenum rating of the installation by creating a passageway from the occupied space to the space above the drop ceiling. In order to maintain the plenum rating, the opening through the ceiling where the cable extends through the ceiling is often sealed to prevent passing of air through the opening. Alternately, the cable may be run under the ceiling rather than passing it through the ceiling. This tends to be unsightly.

With existing wired microphones that have the cable extending through the ceiling with a sealed opening, the length of the cable cannot be readily adjusted below the ceiling. Therefore, changing the length of the cable to reposition the mic (both in terms of dimension and directional position) requires of the mic requires that the cable is cut, extra cable added to adjust the length, and the electronics reconnected. If the cable is shortened, the coiled up cable can get in the way and is unsightly.

There is a need therefore for apparatus that facilitates adjustment of wired microphones without destroying plenum ratings.

The present invention comprises a cable adaptor and adjuster that address the shortcomings of prior systems. The adaptor described herein is capable of retaining a microphone in a desired position and for allowing adjustment of the position by increasing and decreasing the length of the microphone cable. The adaptor further creates an air-tight seal between the adaptor body and the microphone cable to maintain a plenum between adjacent spaces on either side of the adaptor.

BRIEF DESCRIPTION OF THE DRAWINGS

The invention will be better understood and its numerous objects and advantages will be apparent by reference to the following detailed description of the invention when taken in conjunction with the following drawings.

In FIG. 3 the cap has been tightened so that the microphone cable is immovably secured in the adaptor.

FIG. 5 is a close up view of a second embodiment of an adaptor according to the present invention, showing the adaptor components in a partially assembled condition.

FIG. 6 is a perspective view of a third embodiment of an adaptor according to the present invention, showing the adaptor assembled and a microphone attached to the microphone cable.

DETAILED DESCRIPTION OF ILLUSTRATED EMBODIMENTS

The invention will now be described in detail with reference to the drawings. It will be understood that relative directional terms are used at times to describe components of the invention and relative positions of the parts. As a naming convention, the plane of the floor in a living or work space is considered to be a generally horizontal surface. The ceiling is a plane that in most installations is parallel to the floor, though not always. Other relative directional terms correspond to this convention: "upper" refers to the direction above and away from the ground plane; "lower" is generally in the opposite direction, "inward" is the direction from the exterior toward the interior of the adaptor, "vertical" is the direction normal to the horizontal ground plane, and so on.

Figure 1:
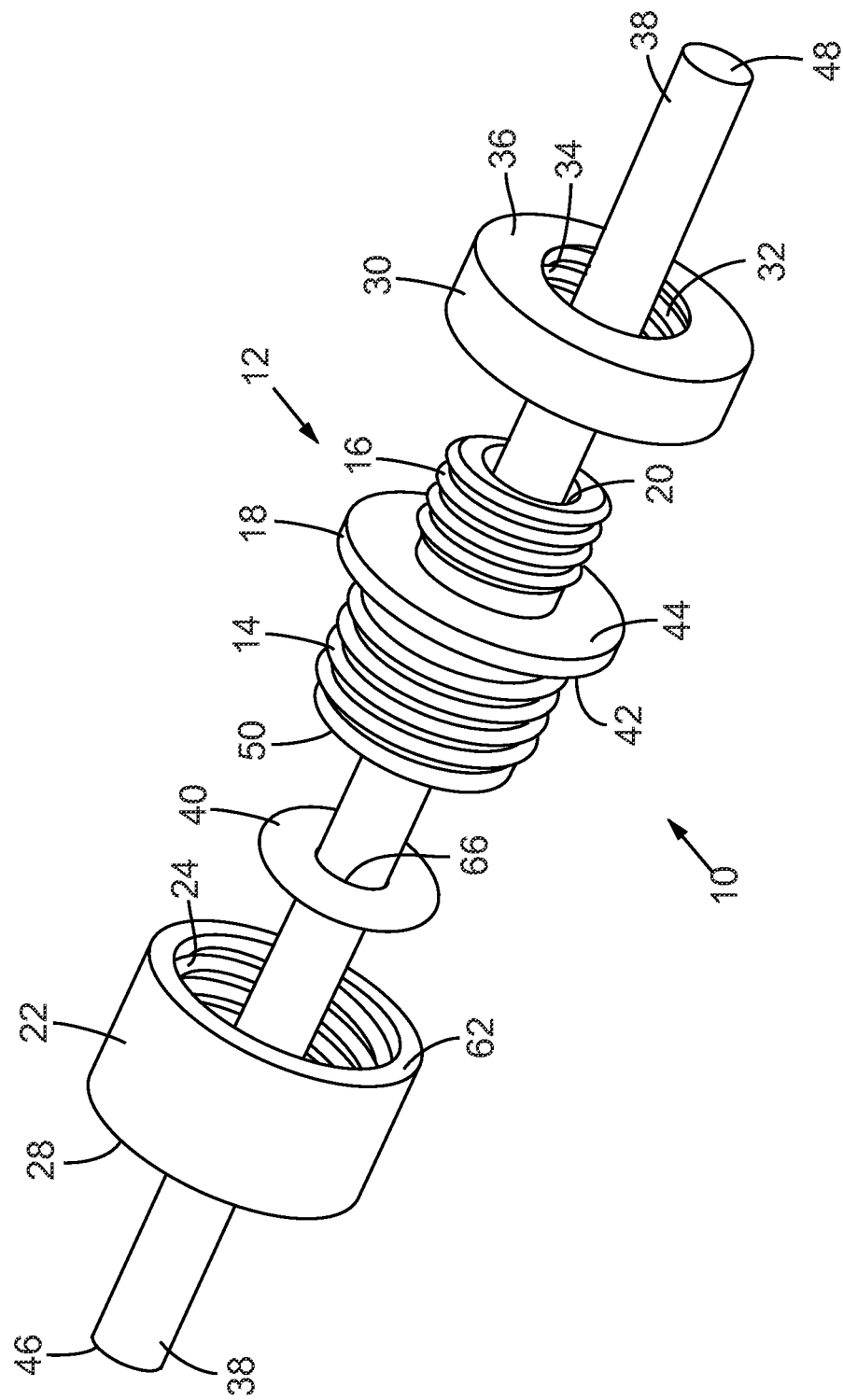
FIG. 1 is a perspective exploded view of a first embodiment of a cable microphone adaptor according to the present invention, illustrating the adaptor from an angle that shows one side of the components of the adaptor.
Figure 2:
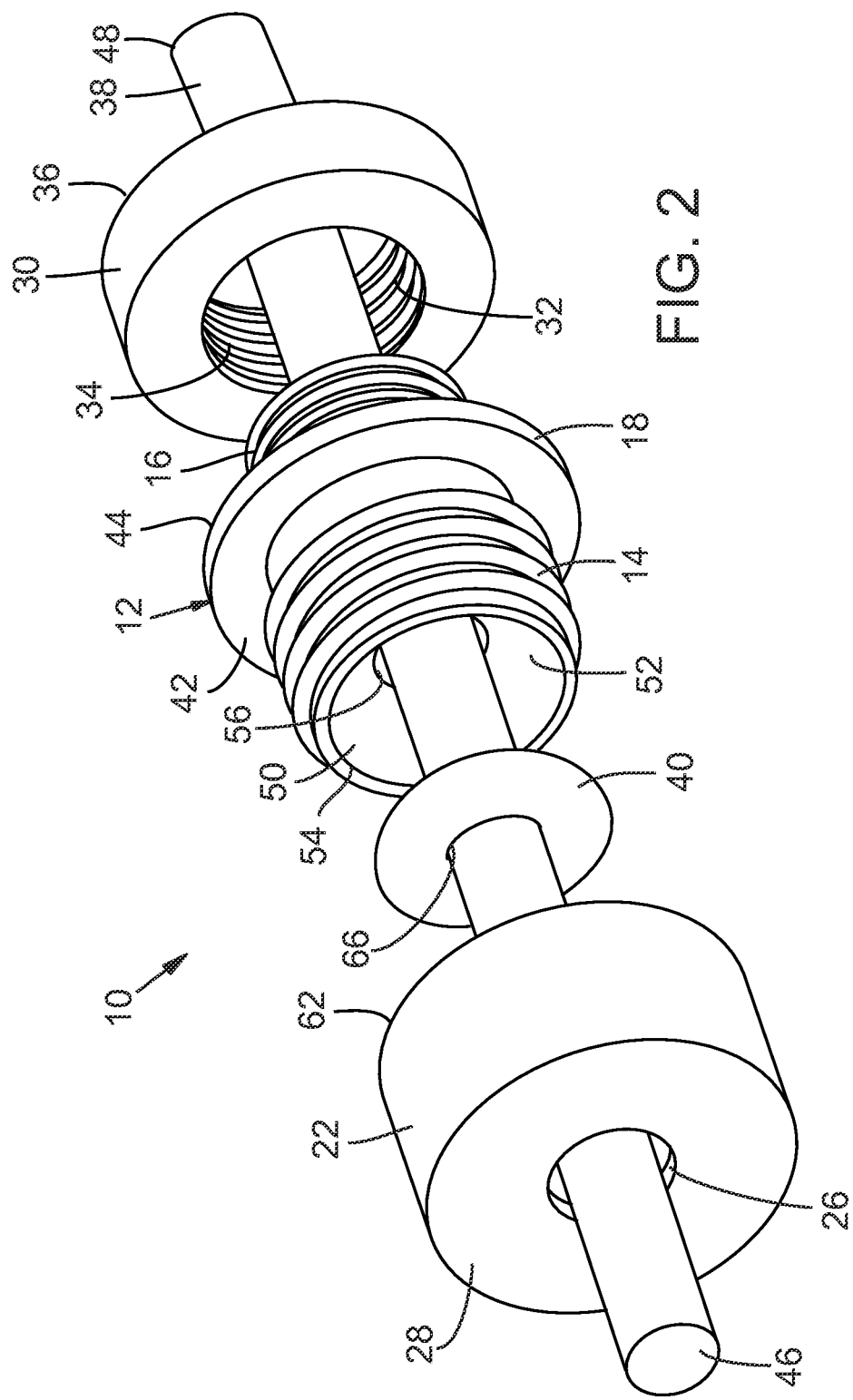
FIG. 2 is a perspective view of the adaptor shown FIG. 1 but showing the adaptor from an angle that shows the components of the adaptor from the opposite side of the components from the view of FIG. 1.

Turning now to the drawings, a first embodiment of an adaptor 10 is shown in FIGS. 1 and 2. The adaptor 10 comprises a main body 12 having a first threaded end 14 and an opposite second threaded end 16 with a circumferential flange 18 separating the first and second threaded ends and extending from the main body 12. A bore 20 extends longitudinally through main body 12. A cap 22 has an internally threaded interior 24 and a bore 26 through the outer end 28 of the cap. Cap 22 threads onto first threaded end 14. A nut 30 has an internally threaded interior 32 and a bore 34 through the outer end 36 of the nut. Nut 30 threads onto second threaded end 16.

A microphone cable 38 extends through bore 26 in cap 22, bore 20 through main body 12 and bore 34 in nut 36. An O-ring 40 is captured between cap 22 and main body 12 as detailed below and the cable 38 extends through the central opening 66 in O-ring 40. The O-ring is a pliable material such as rubber and the diameter of central opening 66 of the O-ring is just slightly larger than the outer diameter of mic cable 38 so that the mic cable is easily inserted through the central opening of the O-ring.

In the assembled adaptor, with cable 38 extending through the bores through the components just described, cap 22 threads onto main body 12 with the threaded interior 24 of the cap threaded onto first threaded end 14, and with O-ring 40 between the cap and the main body. On the opposite end of the main body 12, the threaded interior 32 of nut 30 is threaded onto second threaded end 16 of main body 12.

Circumferential flange 18 has opposite flattened sides which are referred to herein as "adjustment side" 42 and the opposite, "fixing side" 44. As detailed below, adaptor 10 is designed to extend through a bore in a surface such as a ceiling, a wall, or a wall of a junction box to give a few examples. The size of the bore through the wall is greater than the size of the seconded threaded end 16 but less than the diameter of flange 18. When adaptor 10 is assembled, the second threaded end 16 is inserted through such a bore until the fixing side 44 of the flange 18 abuts the outer surface of the wall. For example, if the adaptor is installed through a bore in a ceiling tile, the second threaded end 16 is pushed through the bore in the tile until the fixing side of the flange 18 butts against the ceiling tile with the fixing side 44 of flange 18 pressed against the room-facing side of the tile. On the opposite side of the tile—that is, the side of the tile above the living space, in the plenum space, the nut 30 is threaded onto the second threaded end 16 to fix the main body 12 to the tile. The adjustment side 42 of the flange 18 thus faces toward the living-space below the ceiling tile. Typically, a microphone is attached to the end 46 of the microphone cable 38 while the opposite end 48 is attached to other electronics.

FIG. 2 is an exploded view similar to FIG. 1 except showing the components described above from the opposite angle. In this view it may be seen that main body 12 has an opening 50 interiorly of first threaded end 14 and that the wall 52 of the opening 50 angles or slopes inwardly toward the center of the main body. In other words, the diameter of opening 50 at the outermost edge 54 of the main body 12 is greater than the diameter of the opening moving in the direction toward the center of the main body—to the right in the view of FIG. 2 to define a frusto-conically shaped surface. The diameter of opening 50 at the outermost edge 54 of the main body 12 is roughly the same as the outer diameter of O-ring 40. Moving toward the center of the main body, the diameter of opening 50 near the center 56 is less than the diameter of O-ring 40.

Figure 3:
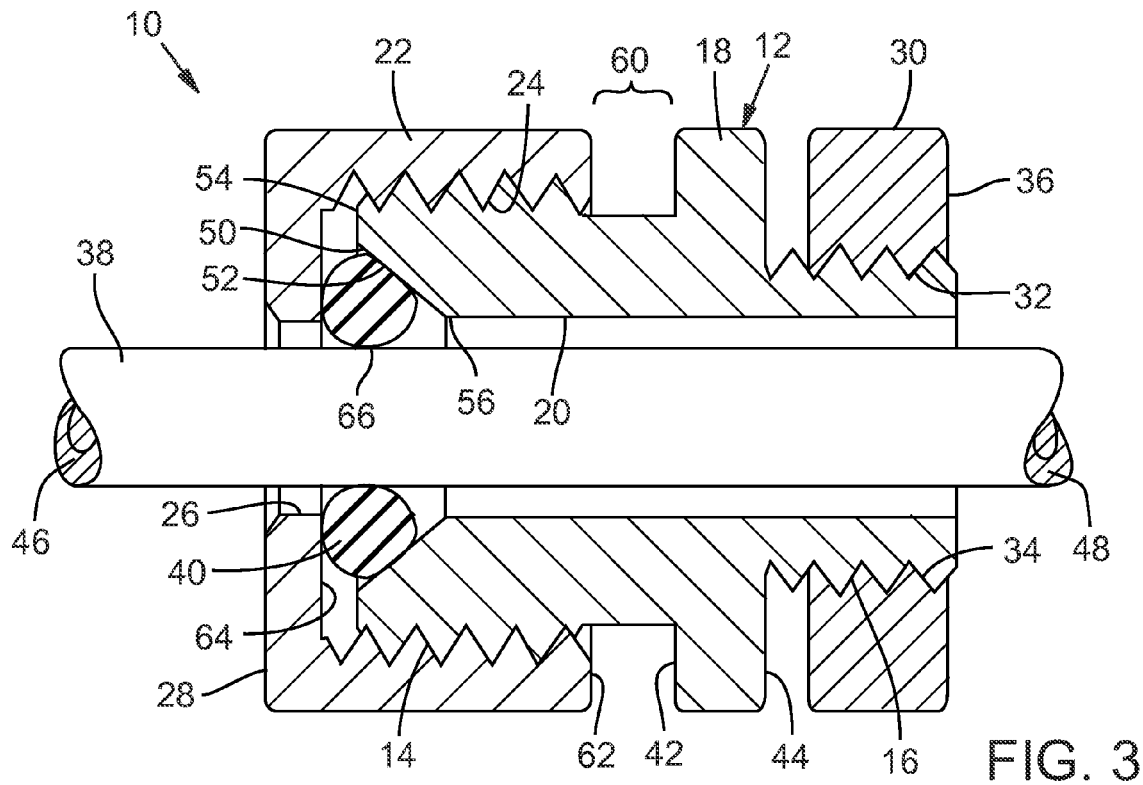
FIG. 3 is a side elevation and cross sectional view of the assembled adaptor according to the present invention to illustrate the internal structures.
Figure 4:
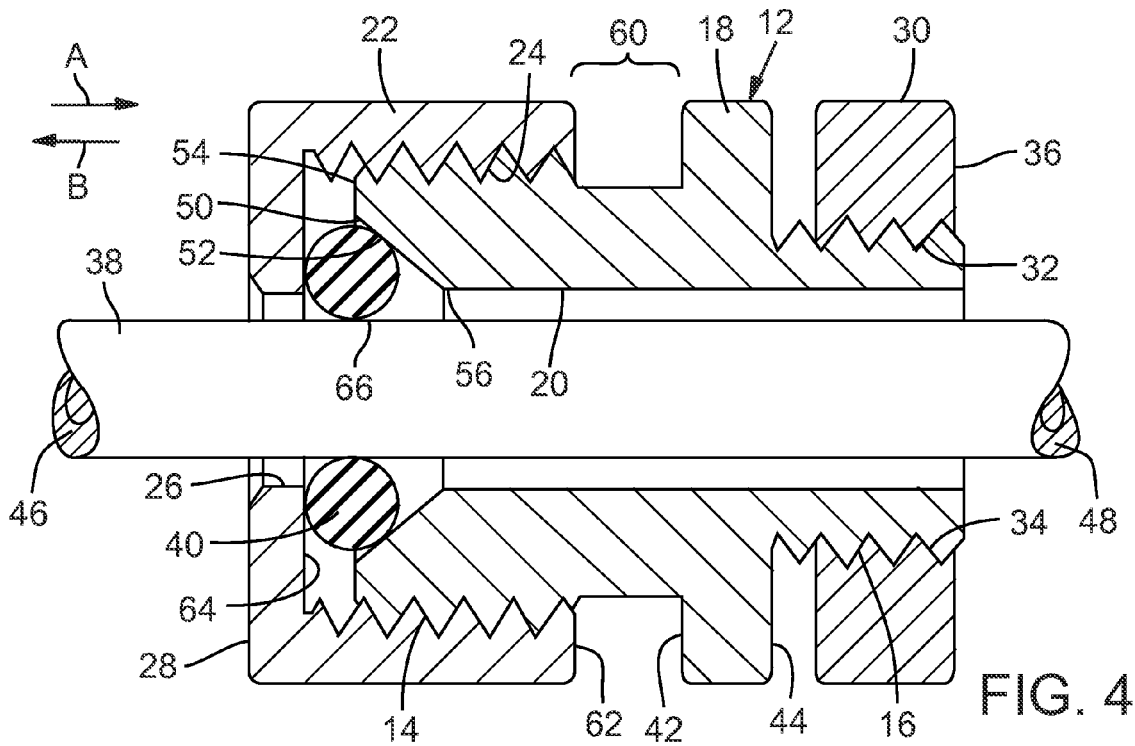
FIG. 4 is a side elevation and cross sectional view of the assembled adaptor similar to the view of FIG. 3, but in FIG. 4 the cap has been loosened so that the microphone cable is movable relative to the adaptor as illustrated with the arrows A and B.

In FIGS. 3 and 4 the components described above and shown in FIGS. 1 and 2 are shown assembled. Thus, the cable 38 is extended through the components and the cap 22 is threaded onto first threaded end 14 of main body 12, and nut 30 is threaded onto second threaded end 16 of the main body. In FIG. 3 there is a space 60 between adjustment side 42 of flange 18 and the nearest, facing edge 62 of cap 22. This space allows for adjustment of the cap 22 on the threaded end 14—tightening and loosening the cap relative to the main body.

In FIG. 3, nut 22 is threaded tightly onto first threaded end 14 of main body 12. As the nut is threaded inwardly onto main body 12, O-ring 40 is forced inwardly in opening 50 so that the outer surface of the O-ring is forced along the narrowing sloped wall 52—the O-ring is pushed to the right in the view of FIG. 3 by the interior wall 64 of nut 22 that surrounds opening 26. As the O-ring 40 is forced into the gradually narrowing opening 50 and down the sloped wall 52, the O-ring 40 is compressed axially inwardly toward the center of opening 66 of the O-ring. As the O-ring thus compresses, the interior opening 66 of the O-ring is compressed tightly around cable 38. As this happens the O-ring compresses against the cable, capturing the cable 38 and making movement of cable 38 through adaptor 10 very difficult and thereby fixing the cable relative to the main body. Stated another way, when cap 22 is tightened onto main body 12, the cable is captured by the compression of the O-ring 40, which is compressed between interior wall 64, the sloping walls of opening 50, and the cable 38, so that relative movement between the cable 38 and the adaptor 10 is prevented (although the compressive capture of the cable by the O-ring may be overcome by pulling very forcibly on the cable 38, the amount of force required depending of course on the tightness of the cap on main body 12). As detailed below, when the cap 22 is tightened onto main body 12, there is an airtight seal formed through bore 20.

FIG. 4 illustrates loosening of cap 22 from its locked position shown in FIG. 3. In FIG. 4, cap 22 has been loosed from main body 12. As cap 22 is loosened on first threaded end 14, this causes decompression of O-ring 40 as the nut moves away from the flange 18 and concomitant lessening of the compression between O-ring 40 and cable 38. The space 60 in FIG. 4 is greater than the analogous space 60 in FIG. 3. This loosening of cap 22 releases the engagement between O-ring 40 and cable 38 and thus allows the cable 38 to be moved relative to the adaptor 10 in both directions as shown by arrows A and B.

This allows for simple repositioning of the microphone (which is attached to end 46 of the cable). Moreover, with cap 22 loosened from its locked or tightened position of FIG. 3, the cable 38 may be axially rotated relative to the main body 12. Rotation may be 360 degrees or more in either direction relative to the main body. This allows for increased ability to point the microphone in the desired direction. For example, if the microphone (or several microphones) are suspended from the ceiling over a conference table, the height of the mics relative to the table (i.e., arrows A and B) can be easily adjusted, and rotation of the cables and mics relative to the adaptor 10 allows the user to "point" the mics toward the desired sound source (e.g., people speaking) or away from unwanted sound sources (e.g., TV speakers, HVAC vents, etc.).

In FIG. 5 a second embodiment of an adaptor 10 according to the present invention is illustrated. Here, the second threaded end 16 of main body 12 is relatively larger and relatively longer than the first threaded end 14 and the nut 30 is shown spaced apart from the main body—that is, not threaded onto threaded end 16. This embodiment includes a cap 22 with a knurled surface 68. This embodiment would be used where the bore through which the main body is inserted in an installation is of larger size than the embodiment of FIGS. 1 through 4. It will also be appreciated that the second threaded end 16 may have one flattened side so that in cross section the threaded barrel is D-shaped rather than round. In this instance the second threaded end may be inserted through a bore that has a like D-shape in a wall or other surface. The mating D-shaped parts prevent rotation of the main body 12 relative to the surface.

An adaptor 10 is shown with a microphone 70 on cable 30 in FIG. 6. In this embodiment, a finishing flange 72 is used between cap 22 and flange 18 to provide a finished appearance.

Figure 7:
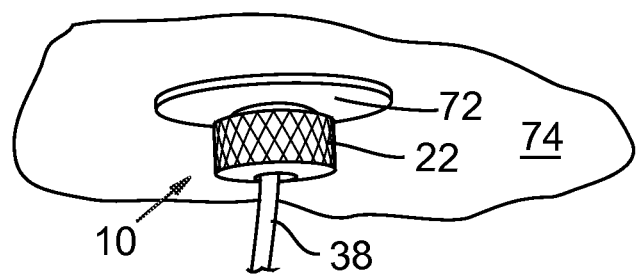
FIG. 7 is a perspective view of the adaptor shown in FIG. 6, with the adaptor extending through a ceiling tile so that just the external portion of the adaptor and microphone cable are in the view
Figure 8:
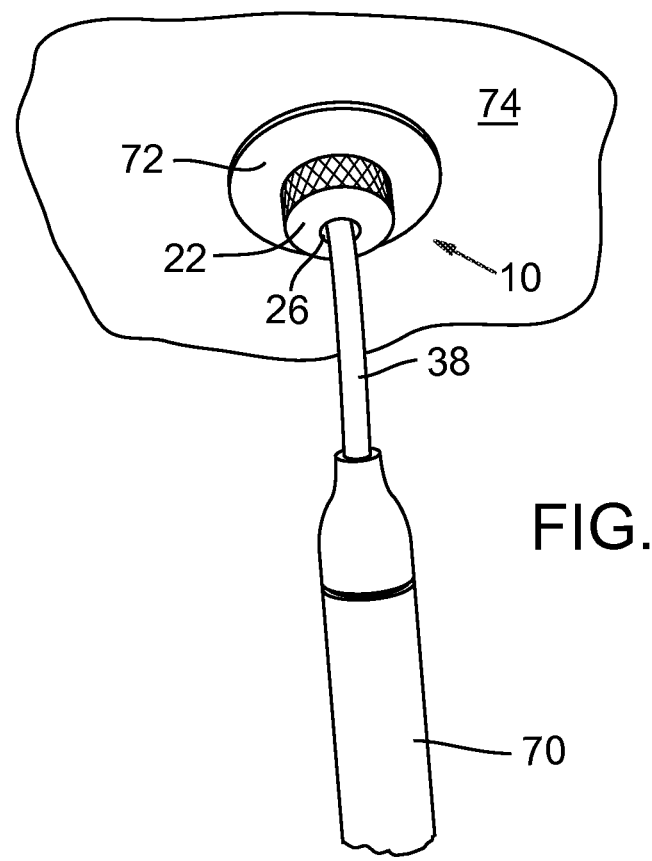
FIG. 8 is a perspective view of the installation of FIG. 7, showing the microphone on the microphone cable

The embodiment of FIG. 6 is shown installed in a ceiling tile 74 in FIGS. 7 and 8. The finishing flange 72 provides a clean and finished appearance for the adaptor 10 on the interior-facing side of the ceiling tile 74.

Figure 9:
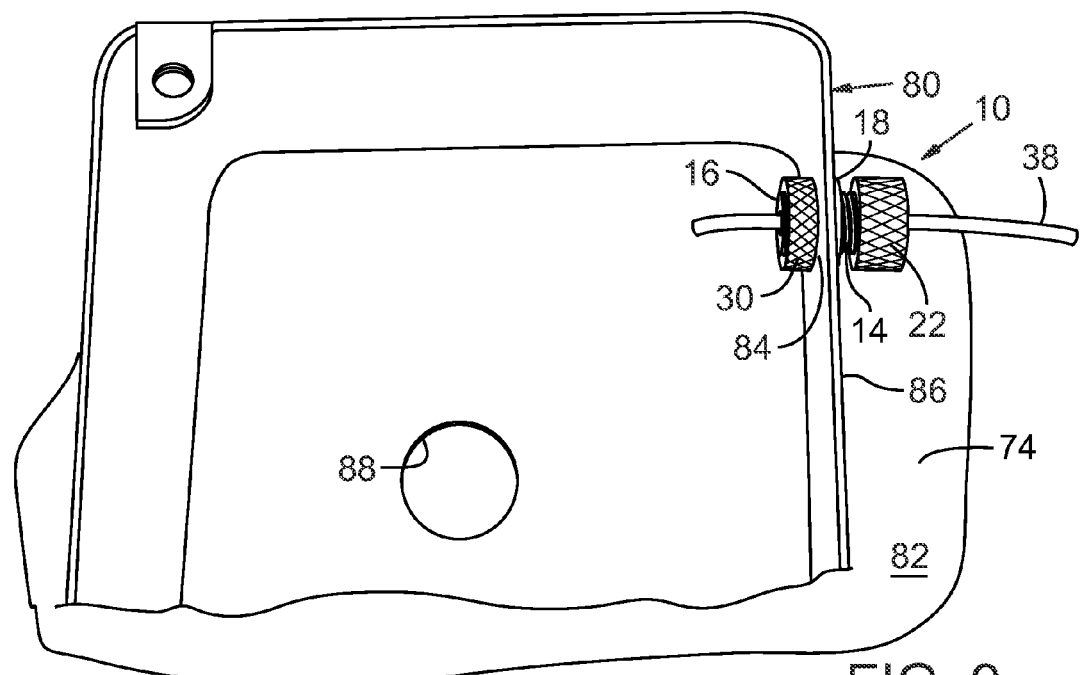
FIG. 9 is a perspective view of the adaptor of FIG. 1 with the adaptor installed in a junction box.

Turning now to FIG. 9, an adaptor 10 is shown as used with a junction box 80 that is shown attached to a surface 82, which in this instance is the upper surface of a ceiling tile such as ceiling tile 74 of FIG. 5. The "upper surface" 82 of the ceiling tile 74 is the surface of the tile that is above the room over which the tile is installed. In other words, the upper surface is the surface opposite the interior-facing surface shown in FIGS. 7 and 8. As may be seen the second threaded end 16 of main body 12 extends through a bore 84 in a wall 86 of junction box 80, which as noted above may be D-shaped when the second threaded end 16 is also D-shaped. The main body 12 is securely attached to wall 86 with nut 30, which when tightened captures the wall 86 around the bore 84 between the fixing surface 44 of flange 18 and the nut 30 (i.e., the portion of wall 86 immediately surrounding the bore 84 is captured between the nut and the flange—when the nut is tightened it secures adaptor 10 securely to the junction box). There is a bore 88 in the wall of the junction box 80 that rests against the surface 82 of ceiling tile 74.

Figure 10:
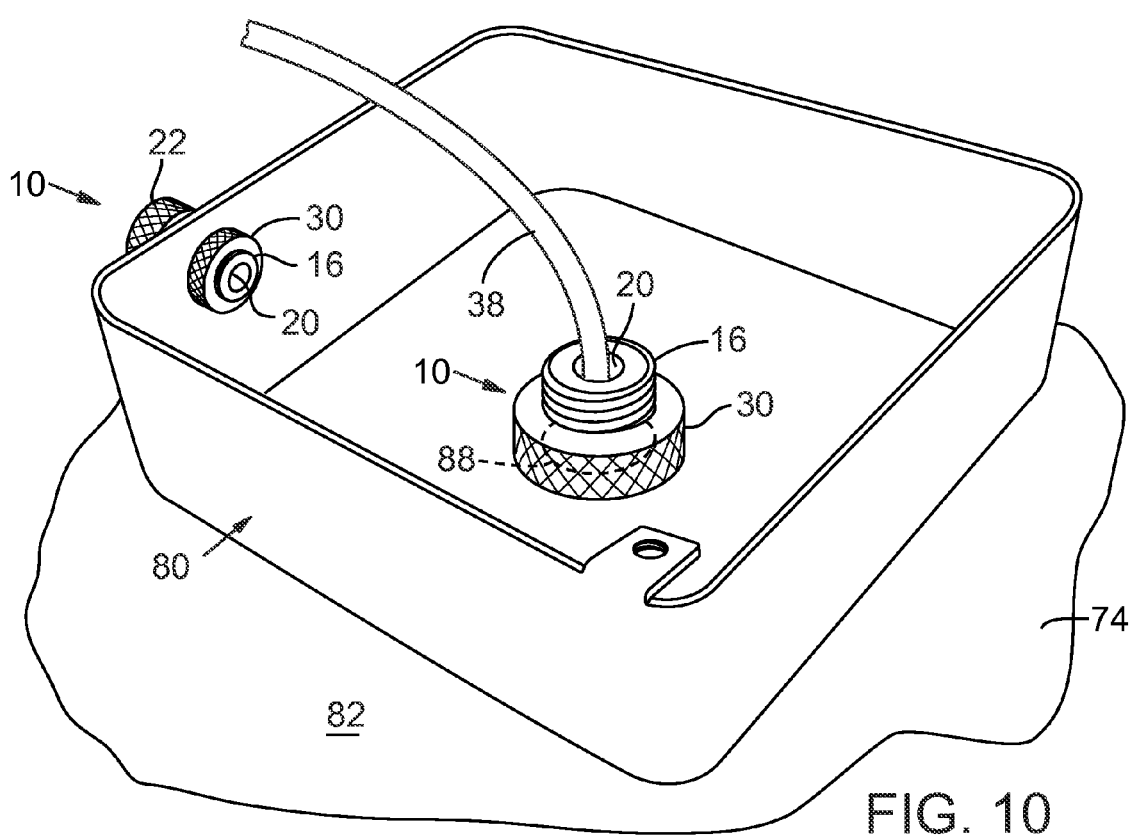
FIG. 10 is a perspective view of the junction box seen in FIG. 7 with a second adaptor of the type shown in FIG. 6 extending through the underlying ceiling and into the junction box.

In FIG. 10 a second adaptor 10 has been assembled with junction box 80—the adaptor 10 through side wall 86 is shown in place as described above with respect to FIG. 9, but in this case, a bore has been formed in ceiling tile 74 so that the bore through the tile aligns with the bore 88 in the junction box. Adaptor 10 that extends through bore 88 is of the type of embodiment shown in FIG. 5, with a relatively larger and longer second threaded end 16. It will be appreciated that the adaptor extends through tile 74 as shown and described elsewhere With respect to FIG. 10 a significant length of cable 38 may be coiled in junction box 80. If a user wants to increase the length of the cable below the ceiling tile, for example, to reposition the microphone that is attached to the distal end of the cable, the cap 22 on adjustment side of the adaptor—which is the side of the installation shown in FIGS. 7 and 8 and which extends through the tile is loosened and this allows the cable to be pulled downwardly—the excess cable coiled in the junction box allows the length of the cable below the tile to be increased. The cable also extends through the adaptor 10 that is positioned in wall 86, which allows a second adjustment in the length of the cable 38.

The length of the cable 38 below the ceiling tile may also be shortened by reversing the sequence described above and pushing the cable back up through the adaptor, where it bunches up in the junction box 80.

When cap 22 is tightened to fix the cable 38 relative to the main body 12, there is no air-passageway through the main body because the O-ring 40 is compressed around the cable 38 as detailed above and thereby defines an air tight seal of the bore 20. There is, therefore, a plenum maintained between the space under the ceiling tile and the air space above the tile. Accordingly, the adaptor 10 of the present invention is usable in situations where the cable is routed through the ceiling (or wall) where a plenum rating is desired.

Those of skill in the art will recognize that certain modifications of the structures described above may be made without changing the nature or scope of the invention. As an example, the threaded ends of the main body and the cap and nut that are threaded thereon may be replaced with other equivalent structures that are configured to selectively tighten and loosen the cap and nut onto the main body. Other similar modifications will be recognized as well.

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

The invention claimed is:

1. An adaptor for a cabled microphone, comprising:
an annular main body having a proximal threaded first end portion, a distal threaded second end portion, an outwardly projecting circumferential flange positioned between the first and second end portions, and a bore extending through the main body, wherein an opening to the bore at the first end portion defines an inwardly narrowing sloped surface such that the diameter of a portion of the bore decreases from the opening of the bore at the first end portion towards the flange;
an annular cap having a threaded internal surface configured to engage the threaded first end portion and an opening in a proximal end surface that is aligned with the bore;
a resilient O-ring positioned between the proximal end surface of the cap and the main body such that the O-ring is radially compressed into the sloped surface as the cap is moved axially toward the main body; and
a nut having a threaded internal surface configured to engage the threaded second end portion, the nut having an opening in an end surface thereof that is aligned with the bore;
wherein the O-ring has a central opening that is aligned with the bore through the main body, the opening in the end surface of the cap, and the opening in the end surface of the nut to thereby define a cable-receiving bore through the adaptor that extends through the opening in the end surface of the cap, the central opening through the O-ring, the bore through the main body, and the opening in the end surface of the nut so that the cable-receiving bore is configured to receive a microphone cable extending through the cable-receiving bore;
and wherein the O-ring is configured to engage a microphone cable positioned in the cable-receiving bore to prevent relative movement between the cable and the main body when the O-ring is compressed into the sloped surface.

2. The adaptor of claim 1, wherein the O-ring is configured to be compressed into the sloped surface and bear onto a microphone cable extending through the bore, creating a plenum seal across the adaptor such that air cannot pass through the bore when the cap is tightened on the threaded first end portion.

3. The adaptor of claim 1, wherein the O-ring is configured to be decompressed from a microphone cable extending through the bore to allow movement of the microphone cable relative to the main body when the cap is loosened from the first threaded end portion.

4. The adaptor of claim 1, wherein the diameter of the central opening through the O-ring is decreased as the cap is tightened onto the main body and the diameter of the central opening is increased as the cap is loosened from the main body.

5. An adaptor for a cabled microphone comprising:
an elongate main body having a first threaded end portion with a frustoconically shaped interior bore adapted to receive a microphone cable;
means for selectively capturing a microphone cable extending through the bore to prevent relative movement between the cable and the main body and for releasing a microphone cable extending through the bore to allow relative movement between the cable and the main body, said means for capturing a microphone cable further comprising an O-ring with an opening therethrough adapted to receive a microphone cable and defining a portion of the bore, the O-ring adapted for making contact with a microphone cable extending through the bore and occluding the bore to prevent air movement therethrough; and means for attaching the main body to a surface such that the cable extends through the surface;

wherein when the means for selectively capturing a microphone cable is in a released position, a microphone cable extending through the bore may be axially rotated within the main body to thereby adjust the direction in which the microphone points, and wherein when the means for selectively capturing a microphone cable extending through the bore is in a captured position, the direction in which a microphone cable extending through the bore points is fixed.

6. The adaptor according to claim 5, wherein the means for selectively capturing a microphone cable further comprises a cap threaded onto the first threaded end portion, and the O-ring being positioned between an interior surface of the cap and the frustoconically shaped interior bore such that the opening through the O-ring has a diameter and defines a portion of the passageway and such that the O-ring is radially compressed into the frustoconically shaped interior bore as the cap is threaded onto the main body to thereby decrease the diameter of the opening through the O-ring and compress the O-ring against a microphone cable extending through the bore.

7. The adaptor according to claim 6, wherein the means for attaching the elongate main body to the surface further comprises a second threaded end portion on said elongate main body, a flange between the first and second threaded end portions, and a nut threaded onto the second threaded end portion, the nut having an opening in an end surface thereof that is aligned with the bore.

8. A method of retaining a microphone cable and for adjusting the direction that a microphone connected to the cable points and the height of the microphone, comprising:

providing an adaptor having a main body comprising an O-ring and a bore extending through the main body, wherein the bore extends through a central opening of the O-ring and an opening to the bore defines an inwardly narrowing sloped surface such that the diameter of a portion of the bore decreases along an axial direction;

inserting the adaptor through an opening in a surface and attaching the adaptor to the surface;

threading the microphone cable through the bore and connecting the microphone to a distal end of the microphone cable;

axially rotating the microphone cable such that the microphone points in a desired direction, and moving the microphone cable longitudinally relative to the adaptor to adjust the length of the microphone cable extending from the adaptor and to thereby adjust the position of the microphone; and restraining the microphone cable relative to the adaptor to prevent relative movement between the microphone cable and the adaptor by compressing the O-ring against the microphone cable such that that the direction and position of the microphone are maintained.

9. The method according to claim 8, further comprising creating an air-tight seal in the bore such that air may not flow through the bore.

10. An adaptor for a cabled microphone comprising:

a main body configured to receive a microphone cable, the main body having an opening at a proximal first end portion, a distal second end portion, and a bore extending through the main body, wherein the bore has an inwardly narrowing sloped surface at the opening such that the diameter of a portion of the bore decreases along an axial direction;

a cap threaded onto the first end portion such that the cap is movable toward and away from the main body by rotating the cap, and the cap having an opening in an end surface that is aligned with the bore; and an O-ring in the main body, the O-ring having a central opening with a first diameter and wherein the central opening is aligned with the bore such that the bore extends through the O-ring;

wherein the O-ring is configured to be radially compressed, thereby reducing the first diameter such that the O-ring may contact a microphone cable extending through the bore as the cap is moved toward the main body and the O-ring is configured to be radially decompressed, thereby increasing the first diameter such that a microphone cable extending through the bore may be axially rotated relative to the O-ring as the cap is moved away from the main body.

11. The adaptor according to claim 10 wherein the O-ring is compressed against the sloped surface as the cap is moved toward the main body.

12. The adaptor according to claim 10, further comprising an outwardly projecting flange on the main body.

13. The adaptor according to claim 10, wherein the O-ring is configured such that a plenum seal is defined across the adaptor so that air cannot pass through the bore when a microphone cable is extended through the bore and the O-ring is radially compressed such that it contacts the microphone cable.

14. The adaptor according to claim 10, wherein the O-ring is configured to bear on a microphone cable extending through the bore to prevent relative movement between the cable and the main body when the cap is tightened on the main body.

15. The adaptor of claim 1, wherein a portion of the bore has a frustoconical shape.

* * * * *